(12) United States Patent
Ryon et al.

(10) Patent No.: US 10,578,022 B2
(45) Date of Patent: Mar. 3, 2020

(54) TRANSFER TUBE ASSEMBLY OF NESTED TUBES AND A CONNECTING SEGMENT HAVING PARALLEL AND OFFSET BORES

(71) Applicant: Delavan Inc., West Des Moines, IA (US)

(72) Inventors: Jason A. Ryon, Carlisle, IA (US); Jacob Greenfield, Granger, IA (US); Lev Alexander Prociw, Johnston, IA (US)

(73) Assignee: Delavan Inc., West Des Moines, IA (US)

( * ) Notice: Subject to any disclaimer, the term of this patent is extended or adjusted under 35 U.S.C. 154(b) by 180 days.

(21) Appl. No.: 15/714,314

(22) Filed: Sep. 25, 2017

(65) Prior Publication Data

US 2019/0093561 A1    Mar. 28, 2019

(51) Int. Cl.
*F02C 7/22*     (2006.01)
*F23R 3/34*     (2006.01)
*F23R 3/36*     (2006.01)
*F23R 3/28*     (2006.01)

(52) U.S. Cl.
CPC ............... *F02C 7/222* (2013.01); *F23R 3/28* (2013.01); *F23R 3/346* (2013.01); *F23R 3/36* (2013.01); *F05D 2240/35* (2013.01); *F05D 2250/36* (2013.01); *F05D 2260/60* (2013.01)

(58) Field of Classification Search
CPC .. F02C 7/22; F02C 7/222; F02C 7/228; F23R 3/36; F23R 3/346; F23R 3/34; F23R 3/28; F16L 39/00; F16L 39/005

USPC ..................... 285/68, 123.3, 121.6
See application file for complete search history.

(56) References Cited

U.S. PATENT DOCUMENTS

| 4,258,544 A * | 3/1981 | Gebhart | F02C 7/222 60/742 |
| 4,467,610 A * | 8/1984 | Pearson | F02C 7/222 138/114 |
| 2010/0071377 A1 | 3/2010 | Fox et al. | |
| 2014/0260275 A1 | 9/2014 | Melton et al. | |

FOREIGN PATENT DOCUMENTS

WO      80/00593 A1    4/1980

OTHER PUBLICATIONS

Extended European Search Report dated Jan. 23, 2019, issued during the prosecution of corresponding European Patent Application No. EP 18196467.7 (8 pages).

* cited by examiner

*Primary Examiner* — Scott J Walthour
*Assistant Examiner* — Todd N Jordan
(74) *Attorney, Agent, or Firm* — Locke Lord LLP; Scott D. Wofsy; Joshua L. Jones

(57) ABSTRACT

A transfer tube assembly includes an outer tube defining a first flow path and an inner tube positioned within the first flow path. The inner tube defines a second flow path in fluid isolation from the first flow path. A connecting segment is downstream from the inner tube and the outer tube. The connecting segment has a first bore in fluid communication with the first flow path and a second bore in fluid communication with the second flow path.

14 Claims, 3 Drawing Sheets

TRANSFER TUBE ASSEMBLY OF NESTED TUBES AND A CONNECTING SEGMENT HAVING PARALLEL AND OFFSET BORES

BACKGROUND OF THE INVENTION

1. Field of the Invention

The present disclosure relates to combustors, and more particularly to fuel transfer tubes in combustors such as used in gas turbine engines.

2. Description of Related Art

In gas turbine engines, such as industrial gas turbine engines used for power production, there is often a need to utilize more than one type of fuel. Fuel manifolds can route multiple different types of fuel to suitable injectors within the gas turbine engine. Traditional fuel manifolds are relatively complicated and bulky, especially when multiple fuels must be routed to the engine while remaining in fluid isolation from one another en route. The complicated nature of fuel manifolds is compounded if it is desired to utilize staged fuel injection, e.g., for improved turn down ratios. A variety of ducting, bores or tubes can be used to guide fuel from the manifold to the desired location.

The conventional techniques have been considered satisfactory for their intended purpose. However, there is an ever present need for improved fluid guidance. This disclosure provides a solution for this.

SUMMARY OF THE INVENTION

A transfer tube assembly includes an outer tube defining a first flow path and an inner tube positioned within the first flow path. The inner tube defines a second flow path in fluid isolation from the first flow path. A connecting segment is downstream from the inner tube and the outer tube. The connecting segment has a first bore in fluid communication with the first flow path and a second bore in fluid communication with the second flow path.

The outer tube can define a longitudinal tube axis. The outer tube and the inner tube can be coaxial about the longitudinal tube axis. The inner tube can include a spring section permitting the inner tube to be extended and compressed along the longitudinal tube axis. The spring section of the inner tube can include a coil shape. The first bore of the connecting segment can define a longitudinally extending bore axis. The second bore of the connecting segment can be positioned off-set from and parallel to the first bore and defined in a portion of an outer wall surrounding the first bore.

In some embodiments, the system includes second connecting segment upstream from the outer tube and the inner tube. The second connecting segment can include a primary bore defining a longitudinally extending primary bore axis. The second connecting segment can include a secondary bore positioned off-set from and parallel to the primary bore and defined in a portion of an outer wall surrounding the primary bore.

In accordance with another aspect, a combustor system includes a combustor case, a manifold operatively connected to the combustor case, and a transfer tube assembly downstream from and in fluid communication with the manifold. The transfer tube assembly is similar to the transfer tube assembly described above. The system includes a fuel distributor downstream from the transfer tube assembly. The transfer tube assembly fluidly connects the fuel distributor to the manifold.

In some embodiments, a second connecting segment, similar to the second connecting segment described above, couples the outer tube and the inner tube to the manifold. The primary bore of the second connecting segment can fluidly connect the first flow path to the manifold. The secondary bore of the second connecting segment can fluidly connect the second flow path to the manifold. The first bore of the connecting segment can fluidly connect the first flow path to the fuel distributor. The second bore of the connecting segment can fluidly connect the second flow path to the fuel distributor.

The manifold can be a dual fuel manifold having at least a first passage and a second passage. The first and second passages can be in fluid isolation from another. The first passage can be in fluid communication with the first flow path and the second passage can be in fluid communication with the second flow path. An end of the outer tube can be mounted to the first passage and an end of the inner tube can be mounted to the second passage.

The fuel distributor can include a first exit bore and a second exit bore. The first exit bore can be in fluid communication with the first flow path and the second exit bore can be in fluid communication with the second flow path. The first bore of the connecting segment can fluidly connect the first flow path to the first exit bore of the fuel distributor. The second bore of the connecting segment can fluidly connect the second flow path to the second exit bore of the fuel distributor.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
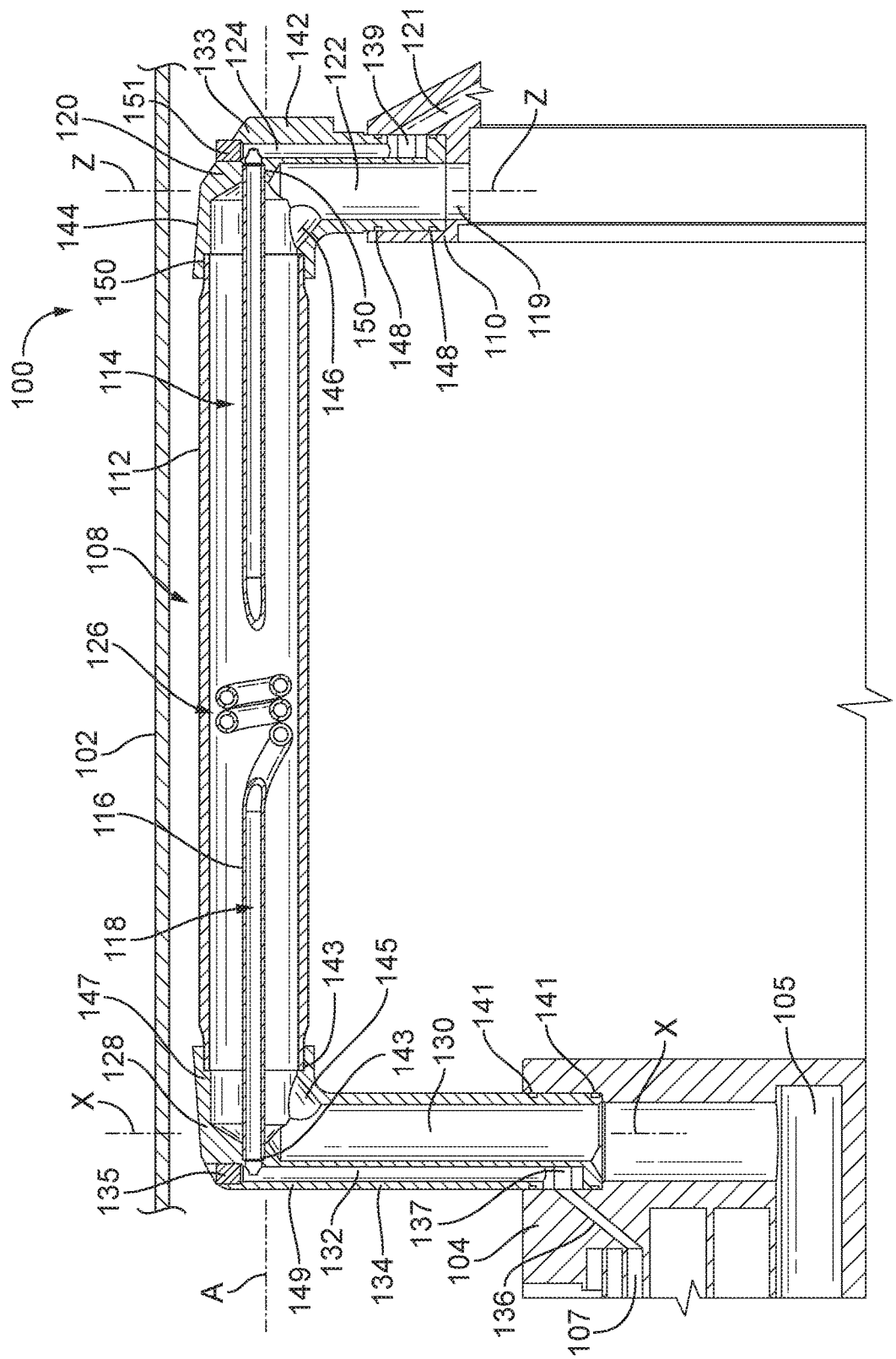
FIG. 1 is a schematic cross-sectional view of an exemplary embodiment of a combustor system constructed in accordance with the present disclosure, showing the transfer tube assembly.

Reference will now be made to the drawings wherein like reference numerals identify similar structural features or aspects of the subject disclosure. For purposes of explanation and illustration, and not limitation, a partial view of an exemplary embodiment of a combustor system with a transfer tube assembly in accordance with the disclosure is shown in FIG. 1 and is designated generally by reference character 100. Other embodiments of combustor systems in accordance with the disclosure, or aspects thereof, are provided in FIGS. 2-3, as will be described. The systems and methods described herein can be used to distribute and/or stage multiple fluids including liquids and gases, such as in dual stage, dual fuel injection for gas turbine engines.

As shown in FIG. 1, a combustor system 100 includes a combustor case 102, a manifold 104, and a transfer tube assembly 108 downstream from and in fluid communication with the manifold 104. The system 100 includes a fuel distributor 110 downstream from the transfer tube assembly 108. The transfer tube assembly 108 fluidly connects the fuel distributor 110 to the manifold 104. The manifold 104 is a dual fuel manifold 104 with at least a first passage 105 and a second passage 107. First passage 105 can be a gas fuel passage and second passage 107 can be a liquid fuel passage. The first and second passages 105 and 107, respectively, are in fluid isolation from another.

Figure 2:
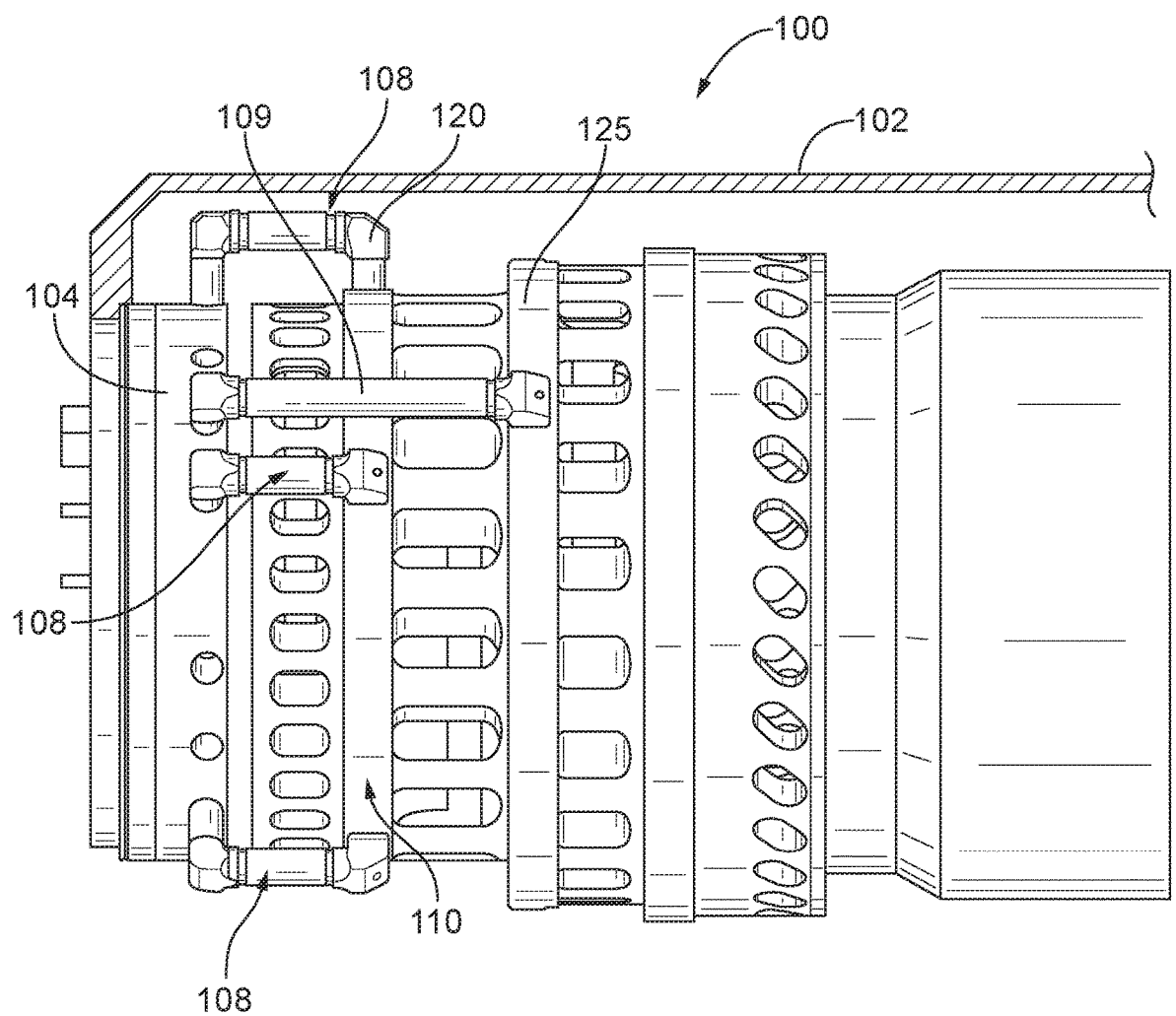
FIG. 2 is a schematic cross-sectional perspective view of the combustor system of FIG. 1, showing multiple transfer tube assemblies.

With reference now to FIG. 2, multiple transfer tube assemblies 108 are circumferentially spaced apart about the annular manifold 104 in order connect other portions of passages 105 and 107 to the fuel distributor 110, resulting in a more even fuel distribution about the annulus of the fuel distributor 110. It is contemplated that manifold 104 can include additional first and second passages similar to first and second passages 105 and 107. Those additional pairs can be in fluid communication with a fuel distributor, e.g. a second stage fuel distributor 125, via a separate transfer tube assembly 109, similar to transfer tube assembly 108.

With continued reference to FIG. 1, the transfer tube assembly 108 includes an outer tube 112 defining a first flow path 114 and an inner tube 116 positioned within the first flow path 114 forming a tube-within-a-tube configuration for transporting fuel along a length. This saves space as compared to traditional side-by-side inlet feeds. The inner tube 116 defines a second flow path 118 in fluid isolation from the first flow path 114. This allows two different types of fuels to be transported along the length referred to above, facilitating dual fuel injection (e.g. liquid fuel and gas fuel). The outer tube 112 defines a longitudinal tube axis A. The outer tube 112 and the inner tube 116 are coaxial about the longitudinal tube axis A. The inner tube 116 includes a spring section 126 permitting the inner tube 116 to be extended and compressed along the longitudinal tube axis A. This allows for compliant thermal expansion to overcome high temperature gradients between hot external temperatures and the cold temperatures of the liquid fuel being transferred through inner tube 116.

In the embodiment of FIG. 1, the spring section 126 of the inner tube 116 includes a coil shape. It is contemplated that spring section 126 could have a variety of suitable shapes. In embodiments where the first flow path 114 is used for gas fuel and the second flow path 118 is used for liquid fuel, the first flow path 114 acts as a stagnant cavity for heat shielding when the transfer tube assembly is transferring liquid fuel through second flow path 118.

As shown in FIG. 1, a connecting segment 120 is downstream from the inner tube 116 and the outer tube 112. The connecting segment 120 has a first bore 122 in fluid communication with the first flow path 114 and a second bore 124 in fluid communication with the second flow path 118. The second bore 124 is plugged with a plug 151 at one end and includes a pocket 139 at the opposing end. Pocket 139 facilitates liquid fuel feed through second bore 124 and out of connecting segment 120. The first bore 122 of the connecting segment 120 defines a longitudinally extending bore axis Z. The second bore 124 of the connecting segment 120 is positioned off-set from and parallel to the first bore 122 and defined in a portion of an outer wall 133 surrounding the first bore 122.

With continued reference to FIG. 1, the fuel distributor 110 includes a first exit bore 119 and a second exit bore 121. The first exit bore 119 is in fluid communication with the first flow path 114 through the first bore 122 of the connecting segment 120. The second exit bore 121 is in fluid communication with the second flow path 118 through the second bore 124 of the connecting segment 120. The connecting segment 120 is an elbow and includes first and second leg portions, 142 and 144, respectively, that are substantially perpendicular to one another. A corner cut 146 between the two perpendicular leg portions 142 and 144 is formed to improve gas feed through the connecting segment and the fuel distributor 110. The outer tube 112 and the inner tube 116 are connected to the connecting segment 120 at braze joints 150. The connecting segment 120 is brazed to the fuel distributor 110 at concentric braze joints 148.

As shown in FIG. 1, the first passage 105 of the manifold 104 is in fluid communication with the first flow path 114 and the second passage 107 of the manifold 104 is in fluid communication with the second flow path 118. First and second passages 105 and 107, respectively, are configured to transfer different types of fuel, e.g. liquid fuel and gas fuel. The transfer tube assembly 108 includes a second connecting segment 128 upstream from the outer tube 112 and the inner tube 116. The second connecting segment 128 includes a primary bore 130 defining a longitudinally extending primary bore 130 axis X. The second connecting segment 128 includes a secondary bore 132 positioned off-set from and parallel to the primary bore 130 and defined in a portion of an outer wall 134 surrounding the primary bore 130. The secondary bore 132 is plugged with a plug 135 at one end and includes a pocket 137 at the opposing end. Pocket 137 facilitates liquid fuel feed from an oblique portion 136 to the secondary bore 132.

With continued reference to FIG. 1, the second connecting segment 128 fluidly connects the outer tube 112 and first flow path 114 to the first passage 105 of the manifold 104 via primary bore 130. The secondary bore 132 of the second connecting segment 128 fluidly connects the inner tube 116 and second flow path 118 to the second passage 107 of the manifold 104. The second connecting segment 128 is an elbow and includes first and second leg portions, 149 and 147, respectively, that are substantially perpendicular to one another. A corner cut 145 between the two perpendicular leg portions 149 and 147 is formed to improve gas feed through the second connecting segment 128 and into the outer tube 112. The second connecting segment 128 is brazed to the manifold at concentric braze joints 141. The outer tube 112 and the inner tube 116 are connected to the second connecting segment 128 at braze joints 143.

Figure 3:
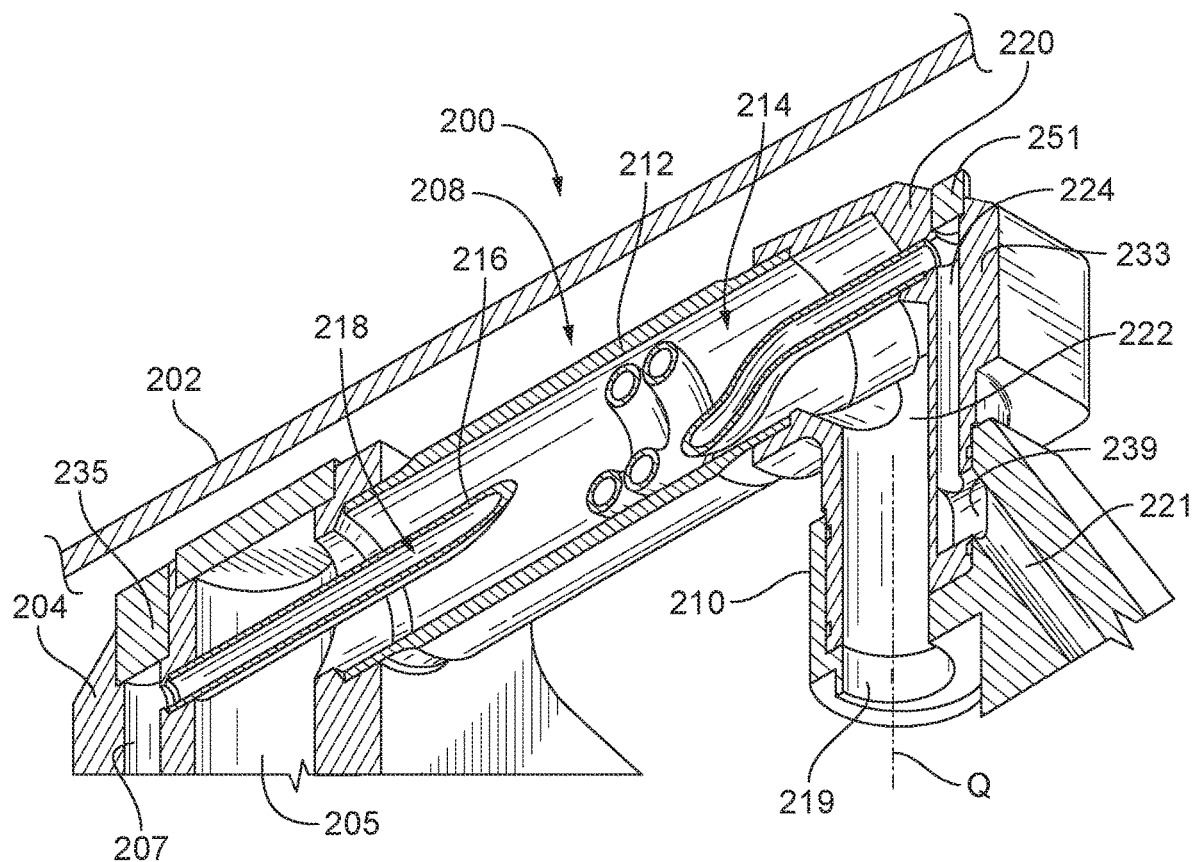
FIG. 3 is a schematic cross-sectional view of another exemplary embodiment of a combustor system constructed in accordance with the present disclosure, showing the transfer tube assembly mounted directly to the manifold.

As shown in FIG. 3 another embodiment of a combustor system 200 includes a combustor case 202, similar to combustor case 102, a manifold 204, similar to manifold 104, and a transfer tube assembly 208, similar to transfer tube assembly 108. System 200 is similar to system 100, except that transfer tube assembly 208 does not include a second connecting segment, e.g. second connecting segment 128. Instead, inner and outer tubes, 216 and 212, respectively, are connected directly into the manifold 204. It is contemplated that inner and outer tubes, 216 and 212, respectively, are brazed into the manifold 204. To account for this difference, the manifold 204 does not include an oblique portion of the second passage 207, e.g. like oblique portion 136 as shown in FIG. 1.

With continued reference to FIG. 3, an end of the outer tube 212 is mounted to the first passage 205 and an end of the inner tube 216 is mounted to the second passage 207. The opposing ends of inner and outer tubes, 216 and 212, respectively, are connected to a connecting segment 220, similar to the connecting segment 120. The connecting segment 220 has a first bore 222 in fluid communication with the first flow path 214 and a second bore 224 in fluid communication with the second flow path 218. The second bore 224 is plugged with a plug 251 at one end and includes a pocket 239 at the opposing end. Pocket 239 is similar to the pocket 139, described above. The first bore 222 of the connecting segment 220 defines a longitudinally extending bore axis Q. The second bore 224 of the connecting segment 220 is positioned off-set from and parallel to the first bore 222 and defined in a portion of an outer wall 233 surrounding the first bore 222. Connecting segment 220 has braze joints similar to those of connecting segment 120.

It is contemplated that the combustor systems 100,200 and transfer tube assemblies 108, 208 as described herein can be retrofitted into existing gas turbine engines. Moreover, while shown and described herein in the exemplary context of fuel manifolds, those skilled in the art will readily appreciate that manifolds as disclosed herein can be used in any suitable application where it is desired to maintain separate fluid circuits in a manifold, such as in food or chemical processing or the like.

Systems as described herein can minimize combustor system size for efficient packaging or advantageous envelope for multiple fluid circuits, e.g. both liquid and gas fuel. Transfer tube assemblies as described herein can fit within envelopes designed for traditional combustor arrangements, e.g., without taking up room outside a combustor case. The methods and systems of the present disclosure, as described above and shown in the drawings, provide for combustor systems and transfer tube assemblies with superior properties including compact form factor. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising: a transfer tube assembly including:
    an outer tube defining an inlet and an outlet and a first flow path therebetween;
    an inner tube positioned within the first flow path, wherein the inner tube defines a second flow path in fluid isolation from the first flow path; and
    a connecting segment downstream from the inner tube and the outer tube relative to the first flow path, the connecting segment having a first bore in fluid communication with the first flow path and a second bore in fluid communication with the second flow path, wherein the second bore of the connecting segment is positioned off-set from and parallel to a longitudinally extending bore axis of the first bore and defined in a portion of an outer wall surrounding the first bore; and
    a fuel distributor in fluid communication with the first and second flow paths via the first bore and the second bore, respectively.

2. The system as recited in claim 1, wherein the outer tube defines a longitudinal tube axis, wherein the outer tube and the inner tube are coaxial about the longitudinal tube axis.

3. The system as recited in claim 1, wherein the outer tube defines a longitudinal tube axis, wherein the inner tube includes a spring section permitting the inner tube to be extended and compressed along the longitudinal tube axis.

4. The system as recited in claim 3, wherein the spring section of the inner tube includes a coil shape.

5. The system as recited in claim 1, further comprising a second connecting segment upstream from the outer tube and the inner tube relative to the first flow path.

6. The system as recited in claim 5, wherein the second connecting segment includes a primary bore defining a longitudinally extending bore axis.

7. The assembly system as recited in claim 6, wherein the second connecting segment includes a secondary bore positioned off-set from and parallel to the primary bore and is defined in a portion of an outer wall of the second connecting segment surrounding the primary bore.

8. A combustor system comprising:
    a combustor case;
    a manifold operatively connected to the combustor case;
    a transfer tube assembly in fluid communication with the manifold, wherein the transfer tube assembly includes an outer tube defining an inlet and an outlet and a first flow path therebetween, an inner tube positioned within the first flow path, and a connecting segment downstream from the inner tube and the outer tube relative to the first flow path, the inner tube defining a second flow path in fluid isolation from the first flow path, a first bore in fluid communication with the first flow path and a second bore in fluid communication with the second flow path, wherein the second bore of the connecting segment is positioned off-set from and parallel to a longitudinally extending bore axis of the first bore and defined in a portion of an outer wall surrounding the first bore; and
    a fuel distributor in fluid communication with the first and second flow paths via the first bore and the second bore, respectively, wherein the transfer tube assembly fluidly connects the fuel distributor to the manifold.

9. The combustor system as recited in claim 8, wherein the transfer tube assembly includes a second connecting segment upstream from the outer tube and the inner tube relative to the first flow path, and the second connecting segment coupling the outer tube and the inner tube to the manifold.

10. The combustor system as recited in claim 9, wherein the second connecting segment includes a primary bore defining a longitudinally extending bore axis, wherein the primary bore fluidly connects the first flow path to the manifold.

11. The combustor system as recited in claim 10, wherein the second connecting segment includes a secondary bore positioned off-set from and parallel to the primary bore and is defined in a portion of an outer wall of the second connecting segment surrounding the primary bore, wherein the secondary bore fluidly connects the second flow path to the manifold.

12. The combustor system as recited in claim 8, wherein the manifold is a dual fuel manifold comprising a first passage and a second passage, wherein the first and second passages are in fluid isolation from one another, wherein the first passage is in fluid communication with the first flow path and wherein the second passage is in fluid communication with the second flow path.

13. The combustor system as recited in claim 12, wherein an end of the outer tube is mounted to the first passage and wherein an end of the inner tube is mounted to the second passage.

14. The combustor system as recited in claim 8, wherein the fuel distributor includes a first exit bore and a second exit bore, wherein the first exit bore is in fluid communication with the first flow path via the first bore and the second exit bore is in fluid communication with the second flow path via the second bore.

\* \* \* \* \*